Oct. 24, 1933.   J. W. HALL   1,931,694
CULVERT COUPLING
Filed Feb. 17, 1931
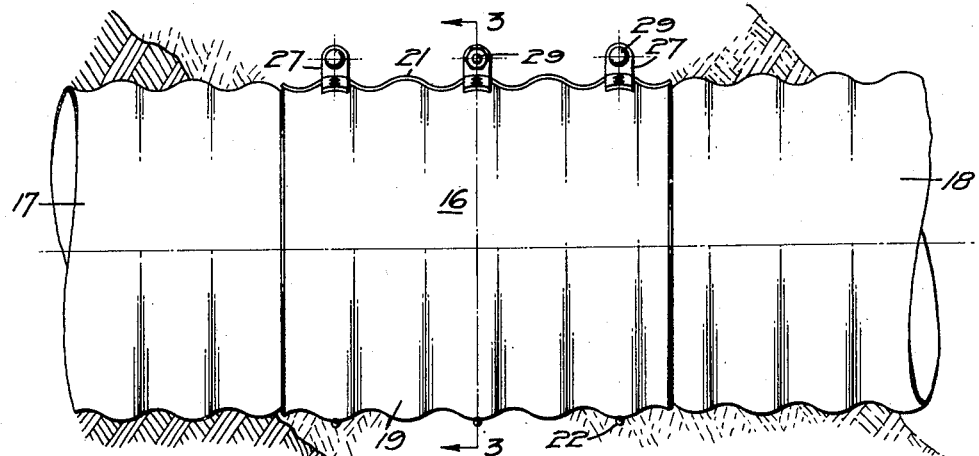
FIG_1_
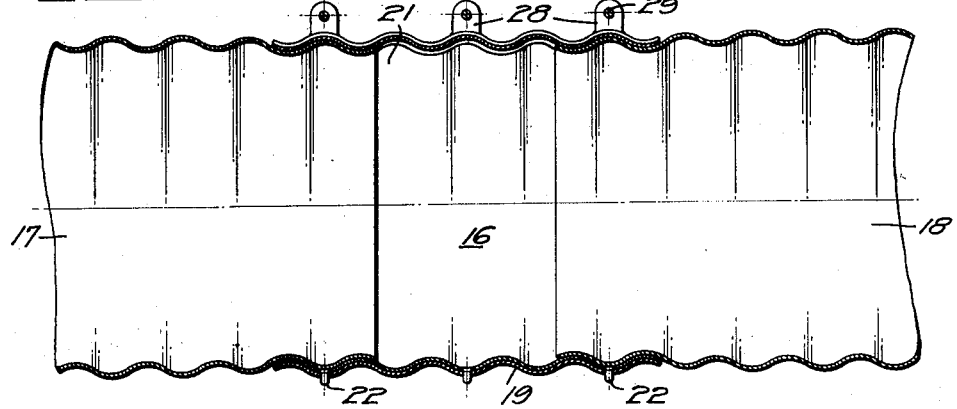
FIG_2_
FIG_3_   FIG_4_
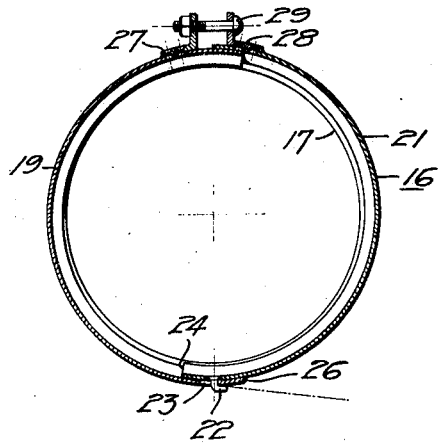   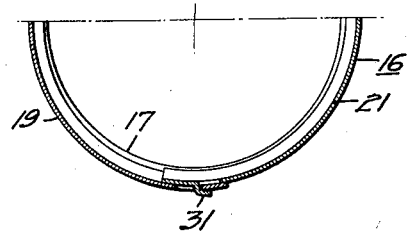
INVENTOR.
John W. Hall
BY White, Prost, Fisher & Lothrop
ATTORNEYS.

Patented Oct. 24, 1933

1,931,694

UNITED STATES PATENT OFFICE 1,931,694

CULVERT COUPLING

John W. Hall, Fresno, Calif., assignor to Western Pipe and Steel Company of California, San Francisco, Calif., a corporation of California Application February 17, 1931. Serial No. 516,298

1 Claim. (Cl. 285—194)

My invention relates to conduit couplings and more particularly it appertains to couplings suitable for corrugated metal culverts.

Heretofore, in connecting two lengths of culverts it has been common to employ a coupling which consisted of an integral cylindrical section which was circumferentially continuous except for a longitudinal slit. The longitudinal slit enabled spreading of the coupling so that it could be placed about the adjoining ends of the two lengths of culvert to be joined and means was provided for clamping the edges of the slit together after the coupling was properly positioned. Frequently, however, the ditch or other channel in which a culvert is disposed is so narrow that it prohibits the application of such a coupling. Furthermore, when it is desired to replace a coupling of that type on a culvert which has been imbedded in the ground the situation is aggravated and occasionally, as when the walls of some structure interfere, the coupling cannot be replaced without digging up part of the culvert.

It is one object of this invention to provide a culvert coupling which can be more easily applied than couplings heretofore employed.

It is another object of the invention to provide a culvert coupling comprising two individual and separable semi-cylindrical parts and means for clamping the parts together. Preferably the means for clamping the parts together enables complete separation of the parts whereby one part can be nested within the other for storage and shipping.

Another object is to provide a culvert coupling comprising separable parts which are adapted to overlap one another thereby forming an approximately water tight joint.

These and other objects and advantages are attained in the embodiment of my invention illustrated in the accompanying drawing, in which:

Fig. 1 is an elevational view of a section of a corrugated culvert showing two lengths of culvert joined together by the coupling of my invention.

Fig. 2 is a longitudinal sectional view of the culvert shown in Fig. 1.

Fig. 3 is a cross sectional view taken on line 3—3 of Fig. 1.

Fig. 4 is a cross sectional view of the lower half of a modified form of coupling.

Referring now to the drawing I have shown a coupling 16 interconnecting the adjacent ends of two lengths of corrugated culvert 17 and 18. The coupling 16 is preferably corrugated in the same manner as the sections 17 and 18 of the culvert and is adapted to overlap the ends of these sections with the corrugations in the coupling registering with the corrugations in both sections.

Preferably, the coupling 16 comprises two individual and separable parts 19 and 21. Each of the parts 19 and 21 is of substantially semi-cylindrical shape and is provided with circumferential corrugations which correspond with the corrugations in the other part, so that when the two parts are placed together, as shown in Fig. 3, the corrugations in both parts are in registry. The part 21 of the coupling is provided with one or more hooked projections 22, secured in any suitable manner thereto and preferably extending outwardly from the surface thereof. The part 19 is provided with one or more apertures 23 corresponding in number to the projections 22 on part 21 and each aperture is so disposed that it is adapted to receive one of the projections 22.

For providing an overlapping connection between parts 19 and 21, the projections 22 are disposed at a position displaced from the edge 24 of part 21 and likewise, apertures 23 are displaced a substantial distance from the edge 26 of part 19. By this construction the extent of overlap will be approximately equal to the sum of the distances of projection 22 and aperture 23 from the edges 24 and 26, respectively. By increasing or decreasing either one or both of these distances, the extent of overlap can be made to assume any desired value. Thus, the lower junction between the two sections 19 and 21 can be made approximately water-tight and while there is a possibility of some leakage, the amount of leakage can be made negligible by increasing the extent of overlap when conditions are such that leakage is harmful.

The edges of sections 19 and 21 at the upper junction of sections, as viewed in Fig. 3, are also adapted to overlap. At this junction suitable means can be provided for drawing the sections 19 and 21 together, thereby firmly clamping the coupling 16 about the ends of culvert sections 17 and 18. For accomplishing this object, I have shown angle members 27 and 28, secured in any suitable manner to sections 19 and 21, respectively, which are provided with holes for receiving a bolt 29. Angle members 27 and 28 can be disposed at a distance from the edges of sections 19 and 21 to provide for the desired overlap.

For further minimizing leakage the hooked projections 22 can be so shaped that they cause the overlapping portions to press more tightly together as the bolts 29 are tightened. Thus, I have shown the contacting surface of each projection 22 as being disposed at an angle with the tangent of the culvert, as illustrated by the dotted line in Fig. 3. As the bolts 29 are tightened, the contacting surface of each projection 22 acts as a cam surface to wedge the overlapping portions into closer engagement.

In applying the coupling 16 in close quarters the part 21 can first be placed in the position shown in Fig. 3, by sliding or rotating the part 21 downwardly along the right hand side of the culvert, as viewed in this figure. Thereafter, part 19 can be inserted in place by sliding the same along the left hand side until the apertures 23 make connection with the projections 22. Then by clamping parts 19 and 21 together by tightening bolts 29, the coupling can be securely fixed in place to form a substantially water-tight connection.

In Fig. 4 I have illustrated a modification in which the hooked projection is formed integrally with the part 21. Thus, a hooked projection 31 is provided which is stamped or otherwise formed from the metal in part 21. As in the embodiment shown in Figs. 1 to 3, the hooked projection 31 is preferably displaced from the longitudinal edge of part 21 to provide for the overlap heretofore described. The contacting surface of projection 31 provides for wedging the overlapping portions together in a manner similar to that of projection 22.

While I have shown and described a preferred embodiment of my invention, I do not wish to be limited thereto, since the invention as defined in the appended claim can be embodied in a plurality of other forms.

I claim:

A culvert coupling comprising two individual and separable sections, each of said sections being substantially of semi-cylindrical shape and having circumferential corrugations therein; said sections being adapted to be mutually nested for economical transportation, means for joining longitudinal edges of said sections together in overlapping relationship whereby the junctions of said sections are made approximately water-tight; said means including a hooked projection on the exterior surface of one of said sections which is adapted to be received in an aperture in the other of said sections; said projection extending from said section at an angle with the tangent thereof and cooperating with the rim of said aperture to effect a wedging action between the overlapping portions of said sections.

JOHN W. HALL.